United States Patent [19]

Ricci

[11] Patent Number: 4,739,685

[45] Date of Patent: Apr. 26, 1988

[54] SPLIT FRAME PORTABLE MACHINING LATHE

[76] Inventor: Donato L. Ricci, 834 Spring Creek Rd., Red Wing, Minn. 55066

[21] Appl. No.: 2,167

[22] Filed: Jan. 12, 1987

[51] Int. Cl.⁴ .............................................. B23B 3/22
[52] U.S. Cl. ....................................... 82/4 C; 30/97; 82/4 R
[58] Field of Search ................ 82/4 C, 4 R, 4 E, 4 D, 82/2 E, 2 A, 59, 61, 67, 68, 69, 72, 702, 46; 30/97, 98, 92.5, 93, 96; 148/9 R

[56] References Cited

U.S. PATENT DOCUMENTS

4,418,591 12/1983 Astle ...................................... 82/4 C
4,665,782 5/1987 Vander Pol ........................... 82/4 C Primary Examiner—Frederick R. Schmidt
Assistant Examiner—Lawrence Cruz
Attorney, Agent, or Firm—Merchant, Gould, Smith, Edell, Welter & Schmidt

[57] ABSTRACT

The present invention is a lathe 10 having a stationary member 11 and a rotating gear member 15. A circular race member 23 is connected to the gear member 15 and held in position by means of bearings 17 and 19. Preferably, the bearings 17 and 19 have longitudinal axes perpendicular to the top surface of the stationary member 11. Further, mounting brackets 35 are utilized to quickly and easily mount a motor 70 onto the stationary member 11. A two part tool module 38 is also disclosed.

15 Claims, 3 Drawing Sheets

SPLIT FRAME PORTABLE MACHINING LATHE

BACKGROUND OF THE INVENTION

1. Field of the Invention

This invention relates generally to a machining lathe, and more specifically to a split frame clamshell type portable machining lathe.

2. Description of the Prior Art

The general concept of a split frame clamshell type portable machining lathe is known in the art. However, the prior art machining lathes have several disadvantages associated with them. The prior art machining lathes to date have had a race member that is an integral part of the gear member. It is a common occurrence for a bearing to fail. When the bearing fails and the race member is an integral part of the gear member, substantial damage is done to the entire lathe and it is a very expensive procedure to replace the damaged parts.

In addition, in prior art lathes, the race member is guided in its circular path by two sets of bearings that have their longitudinal axis generally perpendicular to each other.

The portable machining lathes are often used in an environment, such as in a nuclear reactor plant, where it is of the utmost importance to minimize the amount of time that the operator is on the job site. By minimizing the amount of time, the amount of radiation that the operator receives is reduced. The tool block which contains the cutting tool is often secured to the gear member by a plurality of screws. When the tool bit itself breaks or some other portion of the tool block malfunctions, it is necessary to replace the entire tool module, which takes a substantial amount of time. In addition, to date the drive means for the machining lathes have also been mounted directly to the stationary member of the machining lathe. Therefore, when attaching or taking off the drive means, it is necessary to either completely insert or completely take out a plurality of screws. This too is a relatively time-consuming process.

The present invention addresses the problems associated with the prior art devices and provides for a new and improved split frame portable machining lathe. The present invention provides for a replaceable race member, a unique bearing arrangement as well as time saving replaceable tool block modules and drive mean mounts.

SUMMARY OF THE INVENTION

The present invention is a split-frame portable machining lathe for machining a workpiece. The lathe includes a stationary member having first and second generally semi-circular sections cooperatively connected. The stationary member has a top surface, inner sidewall and outer sidewall. Also provided is a means for securing the stationary member to the workpiece. A gear member has first and second generally semi-circular sections cooperatively connected. A first set of bearings cooperatively connected to the top surface of the stationary member proximate the inner sidewall is provided. A second set of bearings cooperatively connected to the top surface of this stationary member proximate the outer sidewall is also provided, whereby a circular path is defined between the first and second sets of bearings. A circular race member having first and second semi-circular race sections is cooperatively connected to the gear member, whereby the race member rotates in the circular path. In one embodiment, the race sections are removably connected to the first and second gear sections respectively. Another feature of the present invention is that the first set of bearings have longitudinal axes which are generally perpendicular to the top surface of the stationary member and the second set of bearings have longitudinal axes which are generally perpendicular to the top surface of the stationary member.

Another feature of the present invention is that the outer edge of the stationary member defines a slot having a first edge and a second edge for receiving a motor mounting bracket. First and second mounting holes are defined adjacent both the first edge and the second edge. The mounting bracket has a base member sized to be accommodated in the slot and the mounting bracket has first and second flange sections. There are also first and second mounting strips, wherein the first strip overlies both the first mounting hole and the first flange and the second strip overlies both the second mounting hole and the second flange. Means for releasably cooperatively connecting the mounting strips to the mounting holes are provided. Still another feature of the present invention includes a tool module having a tool block cooperatively connected to the gear member, the tool block defining a slot. A tool block slide is adapted to be slid into the slot. The tool block slide has an opening for receiving a tool bit. Means for effecting movement of the tool block slide and also means for cooperatively connecting the tool block slide to the tool block are provided. The cooperatively connecting means comprises a mounting bar connected to the tool block slide and the mounting bar being secured to the tool block by means of a screw, or other fastening means, through the mounting bar into a bore in the tool block.

DETAILED DESCRIPTION OF THE INVENTION

Figure 1:
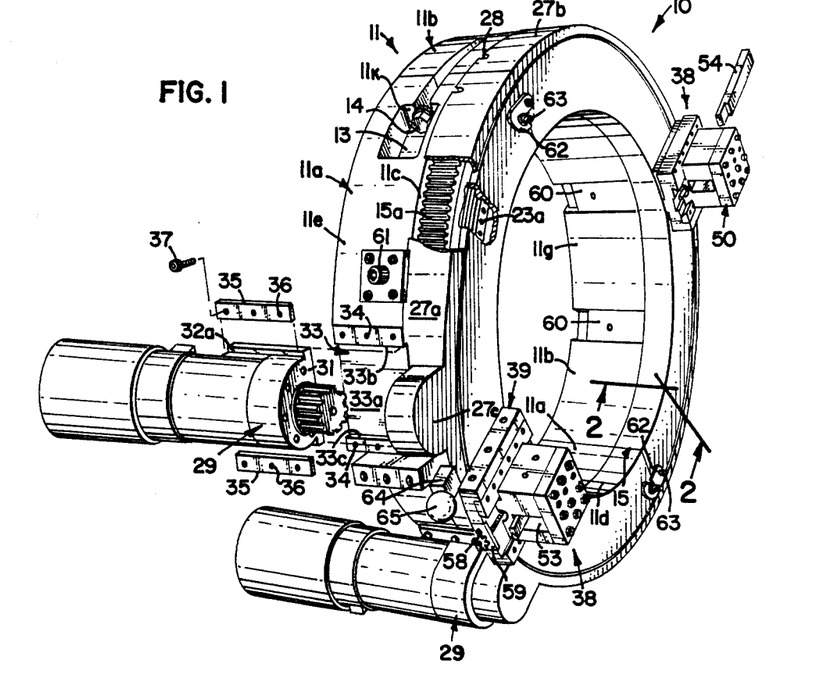
FIG. 1 is a perspective view of the portable machining lathe embodying the present invention.

Referring to the Figures, wherein like numerals represent like parts throughout the several views, there is generally illustrated at 10 a split frame portable machining lathe. The lathe 10 includes a stationary member 11 having a first generally semi-circular section 11a and a second generally semi-circular section 11b cooperatively connected to form the stationary member 11. The first stationary section 11a has a top surface 11c, inner sidewall 11d and an outer sidewall 11e. The second stationary section 11b has a top surface 11f, inner sidewall 11g and outer sidewall 11h. When cooperatively connected, the top surfaces 11c and 11f form the top surface of the stationary member, the inner sidewalls 11d and 11g form the inner sidewall of the stationary member and the outer sidewalls 11e and 11h form the outer sidewall of the stationary member. The first and second sections 11a and 11b may be cooperatively connected by means well known in the art. Generally illustrated in FIG. 1 is a swingable bolt 12 which is swingably mounted to the second stationary section 11b. When the two sections 11a and 11b are brought together, the bolt is swung into the opening 13 of the first stationary section 11a and the nut 14 is tightened against the edges 11k to cooperatively connect the two sections 11a and 11b. Typically, two such swingable bolts 12 and nuts 14 are utilized to cooperatively connect the two sections 11a and 11b the second being 180° from the first.

A gear member 15 has a first generally semi-circular gear section 15a cooperatively connected to a second generally circular section 15b. The configuration of the second gear section 15b is most clearly shown in FIG. 3, the configuration of the first gear section 15a being similar. The gear section 15b has a gear tooth portion 15c that extends around the outer periphery of the second gear section 15b. Similarly, the first gear section 15a has a gear tooth portions 15d around its outer periphery and, when assembled, the gear tooth portions 15d and 15c form a continuous gear tooth. The gear sections 15a and 15b have a top surface 15e and 15f, respectively. The upper surfaces 15g and 15h of the gear tooth portions 15d and 15c, respectively, are spaced slightly below the top surfaces 15e and 15f, respectively.

Figure 3:
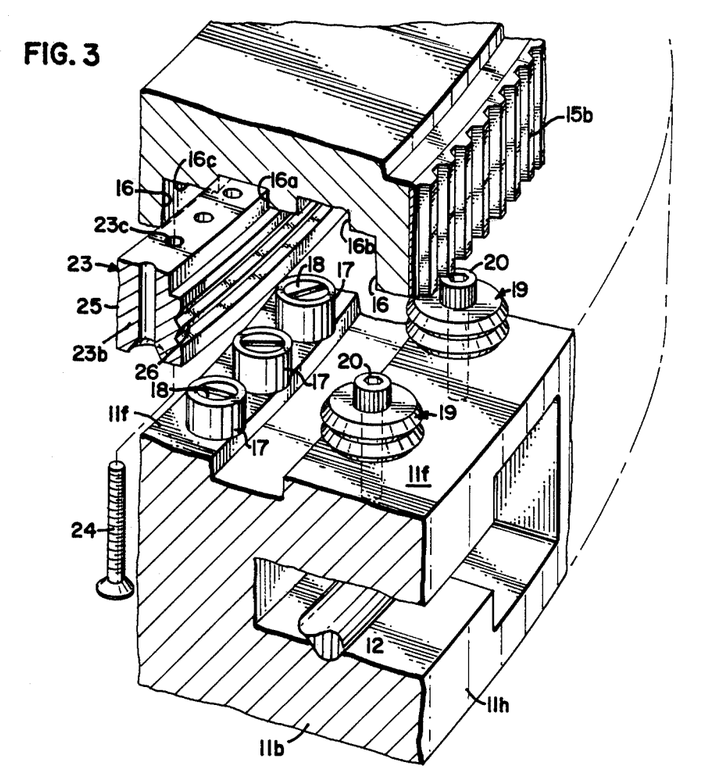
FIG. 3 is an exploded partial perspective view of a portion of the machining lathe of FIG. 1.

The second gear section 15b has an inner cavity 16. While not shown, the first gear section 15a has a similar inner cavity. A first set of roller bearings 17 are cooperatively connected to the top surface 11f of the stationary section 11a by means of bolts 18. The roller bearings 17 are cooperatively connected around the inner periphery of both the first stationary section 11a and second stationary section 11b in the configuration of a circle. The bearings 17 rotate along a longitudinal axis which coincides with the longitudinal axis of the bolts 18 and is generally perpendicular to the top surface 11f. A second set of bearings 19 are cooperatively connected to the top surface 11f of the stationary section 11b proximate the outer sidewall 11h. The bearings 19 are cooperatively connected around the outer perimeter of the stationary sections 11b and 11a by any suitable means such as bolts 20. A shim 21, in the general shape of a washer, may be placed between the bearing 19 and the upper surface 11f to adjust the clearance between the bearings 19 and the race member. The second set of bearings 19 are similarly positioned to form a circular path around the outer perimeters of both of the stationary sections 11a and 11b. A circular path is defined between the first set of bearings 17 and the second set of bearings 19. The bearings 19 rotate on a longitudinal axis which is overlies the longitudinal axis of the bolt 20 and is generally perpendicular to the top surface 11f. Preferably, the bearing 19 has a V-shaped groove 22 which extends around the circumference of the bearing 19. The V-shaped groove 22 is formed by the surfaces 22a and 22b. Preferably, the outer surface of the bearing 19 also has a top inwardly slanted surface 22c and a bottom inwardly slanted surface 22d to give the overall outer appearance of a generally W-shaped surface.

Figure 2:
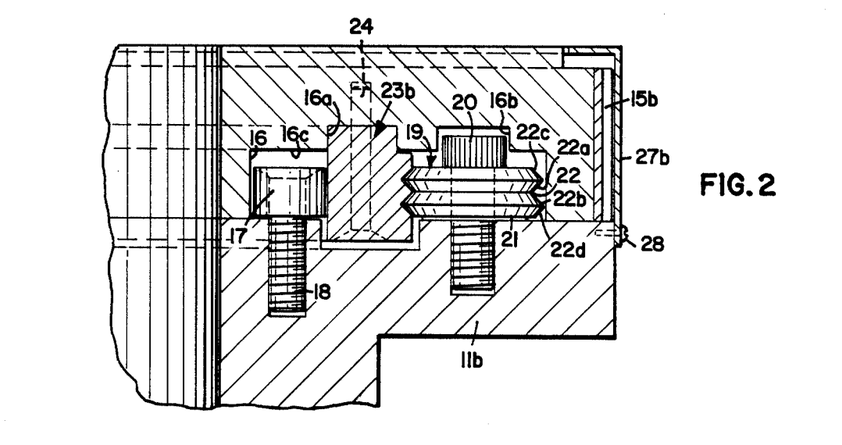
FIG. 2 is a cross-sectional view of the machining lathe of FIG. 1, taken generally along the lines 2—2.

A circular race member 23 has a first semi-circular race section 23b section 23a and a second semi-circular race section 23b cooperatively connected to the gear sections 15a and 15b respectively. A race member 23b is releaseably and cooperatively connected to the second gear section 15b by means of a plurality of bolts 24 through a plurality of holes 23c in the race section 23b. The inner cavity 16 has a notch 16a having the same configuration as the top section of the race section 23a. This further stabilizes the race section 23a. The race section 23a is semi-circular. A similar race section 23a is cooperatively connected in the same manner to the first gear section 15a. A cross-section through the first stationary section 11a and first gear section 15a, at a point 180° from section lines 2—2 would appear identical to the cross-section shown in FIG. 2. The inner cavity 16 also has a clearance opening 16b to provide clearance over the head of the bolt 20. A similar opening 16c is provided for clearance over the roller bearings 17.

When looking at a cross-section, as in FIG. 3, the race sections have an inner sidewall 25 which is straight. The outer sidewall 26 has a surface configuration which mates with the V-shaped groove 22 of the bearing 19 and preferably with the entire W-shaped configuration of the bearing 19. As the race sections rotate the inner sidewall 25 bears against the roller bearings 17 and the outer sidewall 26 bears against the bearings 19.

Another feature of the present invention is a means for rapidly connecting a drive means, or motor, 70 to the lathe 10. The motor 70 may be one of any number of motors which are suitable for this purpose. Such motors would include air motors and hydraulic motors which are well-known in the art. The motors may also be straight back, reversible, or right angled motors as are also well-known in the art. The drive motor 70 has a gear 70a which, when the motor is in place, engages the gear teeth of the gear member 15. Covers 27a and 27b are secured around the gear sections 15a and 15b respectively by means of screws 28, or other suitable fastening means. The covers have a hood protrusion 27c which is sized to extend away from the gear teeth and cover the gear 70a of the motor 70.

Figure 5:
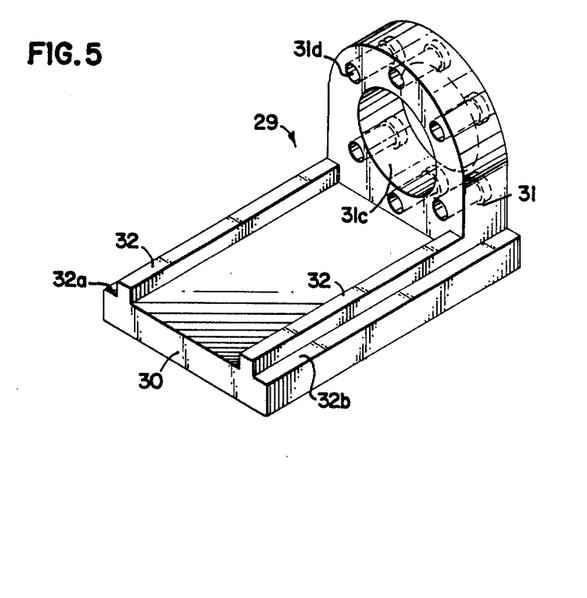
FIG. 5 is a perspective view of a mounting bracket used on the machining lathe of FIG. 1 for mounting a drive motor.

FIG. 5 shows the bracket 29 to which the motor 70 is mounted. The bracket 29 has a base member 30 that has a planar bottom surface. At the top end of the base member 30, a cover 31 is cooperatively connected thereto. An opening 31c is provided in the cover 31 to allow for the gear 70a to be inserted into the opening 31c. A plurality of mounting holes 31d are provided in the cover 31. Screws, or other suitable fastening means, are inserted through the holes 31d and into the motor 70, thereby fastening the motor 70 to the bracket 29. The base member 30 has two bars 32 extending the length of the base member 30, thereby defining a first flange area 32a and a second flange area 32b. The flange areas are parallel to the planar bottom of the base member 30.

Areas for accepting the bracket 29 are located at various points around the stationary member 11. Preferably, four such areas are provided. As shown in FIG. 1, two areas are shown on the first stationary section 11a and, not shown, two similar areas may be provided on the second stationary section 11b. Along the outer sidewall 11e and 11h are slots 33 having a generally planar back 33a. The slot 33 has a first edge 33b and a second edge 33c. The edges 33b and 33c are parallel to each other. The depth of the slot, measured from the outer sidewall 11e to the back 33a is equal to the thickness of the base member 30 of the bracket 29. The width of the slot 33 is also equal to the width of the base member 30 and the height of the slot 33 is equal to the height of the base member 30. Accordingly, the base member 30 is sized to be accommodated in the slot 33. Adjacent the first edge 33b and second edge 33c on the outer sidewall 11e are a plurality of mounting holes 34. Mounting brackets 35, of a general rectangular shape, are utilized. The mounting brackets 35 have mounting holes 36 which are in alignment with the mounting holes 34. When the bracket 30 is slid into the slot 33, the mounting brackets 35 are placed over the mounting holes 34 and screws 37 are inserted through the holes 36 and 34. The mounting brackets are aligned over the mounting holes 34 and also extends over the flange areas 32a and 32b to secure the bracket 29, and hence the motor 70, to the lathe 10. To replace a motor 70, it is only necessary to unloosen the screws 37 and the bracket 29 may be slid out of the slot 33 while the mounting brackets 35 are loosely held in place. A new motor, with mounting bracket 29, may then be slid into the slot 33 and the screws 37 tightened to securely fasten the motor 70 to the lathe 10. It is not necessary to completely remove the screws to replace the motor 70.

Figure 4:
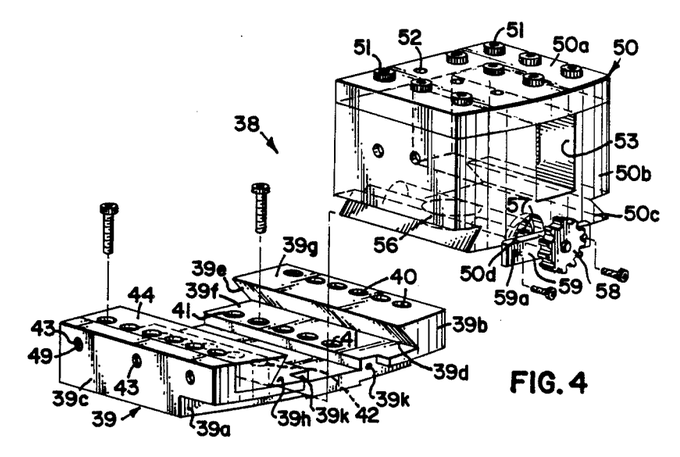
FIG. 4 is an exploded perspective view of a tool module used on the machining lathe of FIG. 1.

An exploded perspective view of a tool module, generally designated as 38, is shown in FIG. 4. The tool module 38 includes a tool block 39 having a base member 39a that has a planar bottom surface. The planar bottom surface rests on and is cooperatively connected to the top surface of the gear member 15. The tool block 39 also has a first sidewall member 39b cooperatively connected to the base member 39a and a second sidewall member 39c cooperatively connected to the base member 39a. Preferably, the base member 39a, first sidewall 39b and second sidewall 39c are a single integral piece. The first sidewall member 39b has a first groove 39d formed by the downwardly sloping surface 39e and the planar surface 39f. The planar surface 39f is generally parallel to the bottom surface of the base member 39a. The first sidewall 39b has a planar top surface 39g. A plurality of mounting holes 40 extend from the top surface 39g completely through the base member 39a. Similarly, mounting holes 41 are formed on the top surface 39f and extend through the base member 39a. The planar surface 39h extends inward from the second sidewall 39c and has a plurality of mounting holes 42 that extend through the base member 39a. Set screw holes 43 are formed in the second sidewall 39c and extend through the sidewall 39c. An adjustable gib member 44 is positioned between the inside of the second sidewall 39b and on top of the surface 39h. The outer sidewall 44a of the gib member 44 extends the length of the second sidewall 39c and its bottom 44b lies on the top surface of the base member 39a. A plurality of mounting holes 45 are formed in the adjustable gib member 44 and extends through the gib member 44. Underneath the gib member 44 are additional mounting holes (not shown) that extend through the base member 39a and are underlying the mounting holes 45. The tool block 39 is fastened to the gear member 15 by means of screws 46 which extend through the mounting holes 40, 41 and 42 and into holes in the gear box 15 (not shown). The mounting holes in the gear member 15 are typically midway between the ends of the sections 15a and 15b. The adjustable gib member 44 is fastened to the base member 39a by means of screws 47 which extend through the mounting holes 45. The screws 47 also extend through the underlying holes in the base member 39a and extend to and are fastened in the mounting holes formed in the gear member 15. The gib member 44 has a downwardly and inwardly sloping inner sidewall 44c which, in conjunction with the surface 39h forms a second groove 48. The surfaces 39f and 39h, along with the surface 39e and inner sidewall 44c form a slot in the tool block 39. The adjustable gib member 44 allows for the overall size of the slot to be adjusted to accommodate for wear that may take place as the lathe 10 is being used. Set screws 49 may be inserted through the holes 43 to move the gib member 44 in a direction toward the first sidewall 39b to allow for wear.

A tool block slide 50 has a top portion 50a cooperatively connected to a bottom portion 50b. One suitable means of cooperatively connecting the top portion 50a to the bottom portion 50b is by means of screws 51 which extend through the top portion 50a into the bottom portion 50b. The holes 52 through which the screws 51 extend are shown in FIG. 4 as not having screws. However, when completely assembled, these holes would also have screws to connect the top portion 50a to the bottom portion 50b. The bottom portion 50b has an opening 53 which is sized to accommodate a tool bit 54. The tool bit 54 is sized so it may be easily slid into the opening 53 and secured into the opening 53 by means of screws 55 which extend through the top portion 50a and would engage the tool bit 54. The tool block slide bottom 50b has a dove tailed base member 50c which is configured and adapted to be slid into the slot of the tool block 39 defined by the grooves 39d and 48. The base 50c has a recess 50d formed therein.

A block 56 is cooperatively connected inside of the recess 50d, by means well-known in the art, such as insertion in a counter bored hole. The block 56 has a threaded bore through which a threaded shaft 57 is positioned. Attached to a first end of the shaft 57 is star gear 58. A mounting clip 59 has a central opening through which the shaft 57 is positioned. The central opening is sized sufficiently to allow the shaft to freely rotate. The mounting clip has two mounting holes 59a. The tool block slide 50 is slid in position in the tool block 39 and fastened to the tool block by means of two screws 60 which extend through the holes 59a and fasten into the tool block 30 into the mounting holes 39k in the base member 39a of the tool block 39.

The lathe 10 is cooperatively connected to the work piece or pipe that is to be worked on by means of a plurality of locater pads 60. The locater pads 60 have a planar, rectangular engaging surface that contacts the workpiece. The locater pads 60 are shown in FIG. 1 in their recessed position. The locater pads 60 are supported through the stationary member 11 by means of a threaded shaft which is connected at the other end to an adjusting knob 61. The adjusting knob is rotated which causes the shaft to rotate and also therefore advances the locater pad 60 inward toward the workpiece. Typically, six locater pads 60 are utilized for a lathe 10. Three locater pads are on each half section of the lathe 10. Further, the locater pads on one section are opposite a locater pad on the other section. That is, if the opposing locater pads were connected by an imaginary line, it would be on a diameter of the lathe 10.

In operation, the lathe 10 is brought to the job site and is in a disassembled configuration. In the disassembled configuration, the first gear section 15a is in position over the stationary section 11a and is held in position by means of the bearings 17 and 19. Initially, to assemble the gear section 15a to the stationary section 11a, one end of the race section 23a is inserted between the bearings 17 and 19 and the entire gear section 15a is fed between the pulleys 17 and 19 until the gear section 15a overlies the stationary section 11a. The second gear section 15b is similarly initially assembled over the second stationary member 11b. The two sections are then assembled around a workpiece and the two semi-circular sections are brought together and assembled by means of the swingable bolts 12 and nuts 14. Further, the gear sections 15a and 15b are cooperatively connected by means of two hooks 62 and pins 63. The hook 62 is swingably mounted to the top of one gear section with the pin 63 connected to the top surface of the other gear section. The hook is then simply swung around the pin 63 to secure the two gear sections in position. Once the lathe 10 is in place, it can be accurately aligned and held in position by advancing the locater pads 60 toward the workpiece. A dial indicator may be used to accurately measure the distance from the center line of the workpiece. Once the lathe 10 is in position, it may then be secured by further tightening all of the locater pads.

Prior to the bringing of the lathe 10 into the work area, the mounting brackets 35 have been loosely connected to the stationary member 11 by means of the screws 37. Then, when it is desired to connect the motor 70 to the lathe 10, it is only necessary that the bracket 29, with the motor attached thereto, be inserted into the slot 33 and the screws 37 tightened. Upon activation of the motor 70, the gear 70a begins to rotate and meshes with the gear teeth of the gear member 15, thereby causing rotation of the gear member 15. If it becomes necessary to replace a motor during the machining of a workpiece, it is only necessary that the screws 37 be unloosened and the bracket 29 is slipped out of the slot 33 with the mounting brackets 35 still loosely held in place.

The rotation of the gear member 15 causes the rotation of the race member 23 which is cooperatively connected to the gear member 15. The bearings 17 and 19 guide the race member 23 around its circular path. The roller bearings 17 in conjunction with the V bearings, or guide wheels, 19 define the circular path in which the race member 23 rotates. The roller bearings 17 provide additional support, minimizing elliptical surfaces caused by extreme cutting loads. The gear member 15 is therefore free to rotate around and on the stationary member 11.

The tool module 38, has previously been assembled to the gear member 15 as previously described. The tool bit 54 had been secured in the opening 53 and firmly secured in position by the screws 55. As the gear member 15 rotates, the tool block 39 is carried with the gear member 15. Upon each complete revolution, the star gear 58 strikes a feed pin positioned in the housing 64. A handle 65 allows for the feed pin to be in an engaged or disengaged position. The operation and construction of the feed pin and housing is well known in the art. Upon striking of the gear pin, the star gear rotates, thereby causing rotation of the shaft 57 inside of the block 56. Since a block 56 is secured to the tool block slide 50, the rotation of the shaft 57 causes an advancing movement of the tool block slide 50. The advancement of the tool block slide 50 of course carries with it the advancement of the tool bit 54. It is understood that by suitable gear arrangements, the tool bit 54 may be caused to move in an up and down direction, as well as the in and out direction that would be caused by the module 38 shown in the figures. If the tool bit 54, shaft 57 or star gear 58 would be damaged, it is only necessary for the two screws 60 to be unloosened and the entire tool block slide 50 slid out from the tool block 39. A new tool block slide 50 may then be reinserted quickly and easily into the tool block 39 without changing the alignment of the tool block 39 on the gear member 15. It is therefore much quicker to change a tool bit due to the two part construction of the tool module 38 as the tool block 39 is always attached to the gear member 15 and it is only necessary to replace the tool block slide 50.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes and presented herein. All alternative modifications and variations of the present invention which follows in the spirit and broad scope of the appended claims are included.

I claim:

1. A split frame portable machining lathe for machining a workpiece, comprising:
    (a) a stationary member having first and second generally semi-circular sections cooperatively connected; said stationary member having a top surface, inner sidewall and outer sidewall;
    (b) means for securing said stationary member to the workpiece;
    (c) a gear member having first and second generally semi-circular sections cooperatively connected;
    (d) a first set of bearings cooperatively connected to said top surface of said stationary member proximate said inner sidewall;
    (e) a second set of bearings cooperatively connected to said top surface of said stationary member proximate said outer sidewall, whereby a circular path is defined between said first and second sets of bearings;
    (f) a circular race member having first and second semi-circular race sections, cooperatively connected to said gear member, whereby said race member rotates in said circular path; and
    (g) said race sections being removably connected to said first and second gear sections respectively.

2. The split frame portable machining lathe of claim 1, further comprising means for driving said gear member.

3. The split frame portable machining lathe of claim 1, further comprising locater pads moveably mounted on said stationary member.

4. The split frame portable machining lathe of claim 1, further comprising:
    (a) said first set of bearings having longitudinal axes generally perpendicular to said top surface of said stationary member; and
    (b) said second set of bearings having longitudinal axes generally perpendicular to said top surface of said stationary member.

5. The split frame portable machining lathe of claim 4, further comprising:
    (a) said race sections each having an inner sidewall and an outer sidewall, said outer sidewalls having a generally V-shaped profile; and
    (b) said second set of bearings having a mating V-shaped profile for engagement with said race sections as said race sections rotate on said circular path.

6. The split frame portable machining lathe of claim 5, further comprising:
    (a) said outer sidewall of said stationary member defining a slot, having a first edge and a second edge, for receiving a motor mounting bracket, first and second mounting holes being defined adjacent both said first edge and said second edge;

(b) said mounting bracket having a base member sized to be accommodated in said slot, and having first and second flange sections;

(c) first and second mounting strips, wherein said first strip overlies both said first mounting hole and said first flange and said second strip overlies both said second mounting hole and said second flange; and (d) means for releaseably cooperatively connecting said mounting strips to said mounting holes.

7. The split frame portable machining lathe of claim 6, further comprising a tool module comprising:
(a) a tool block cooperatively connected to said gear member, said tool block defining a slot;
(b) a tool block slide adapted to be slid in said slot, said tool block slide having an opening for receiving a tool bit;
(c) means for effecting movement of said tool block slide and also means for cooperatively connecting said tool block slide to said tool block; and
(d) said cooperatively connecting means comprising a mounting bar connected to said tool block slide and said mounting bar being secured to said tool block by means of a screw through said mounting bar into a bore in said tool block.

8. A split frame portable machining lathe for machining a workpiece, comprising:
(a) a stationary member having first and second generally semi-circular sections cooperatively connected; said stationary member having a top surface, inner sidewall and outer sidewall;
(b) means for securing said stationary member to the workpiece;
(c) a gear member having first and second generally semi-circular sections cooperatively connected;
(d) a first set of bearings cooperatively connected to said top surface of said stationary member proximate said inner sidewall;
(e) a second set of bearings cooperatively connected to said top surface of said stationary member proximate said outer sidewall, whereby a circular path is defined between said first and second sets of bearings;
(f) a generally circular race member having first and second generally semi-circular race sections, cooperatively connected to said gear member, whereby said race member rotates in said circular path;
(g) said first set of bearings having longitudinal axes generally perpendicular to said top surface of said stationary member; and
(h) said second set of bearings having longitudinal axes generally perpendicular to said top surface of said stationary member.

9. The split frame portable machining lathe of claim 8, further comprising:
(a) said race sections each having an inner sidewall and an outer sidewall, said outer sidewalls having a generally V-shaped profile; and
(b) said second set of bearings having a mating V-shaped profile for engagement with said race sections as said race sections rotate on said circular path.

10. The split frame portable machining lathe of claim 8, further comprising said second set of bearings being releaseably connected to said top surface and a shim positioned between at least one bearing of said second set and said top surface, whereby the location of said at least one bearing may be adjusted upward away from said top surface to allow for wear.

11. A split frame portable machining lathe for machining a workpiece, comprising:
(a) a stationary member having first and second generally semi-circular sections cooperatively connected; said stationary member having a top surface, inner sidewall and outer sidewall;
(b) means for securing said stationary member to the workpiece;
(c) a gear member having first and second generally semi-circular sections cooperatively connected;
(d) a first set of bearings cooperatively connected to said top surface of said stationary member proximate said inner sidewall;
(e) a second set of bearings cooperatively connected to said top surface of said stationary member proximate said outer sidewall, whereby a circular path is defined between said first and second sets of bearings;
(f) a generally circular race member having first and second generally semi-circular race sections, cooperatively connected to said gear member, whereby said race member rotates in said circular path;
(g) said outer sidewall of said stationary member defining a slot, having a first edge and a second edge, for receiving a motor mounting bracket, first and second mounting holes being defined adjacent both said first edge and said second edge;
(h) said mounting bracket having a base member sized to be accommodated in said slot, and having first and second flange sections;
(i) first and second mounting strips, wherein said first strip overlies both said first mounting hole and said first flange and said second strip overlies both said second mounting hole and said second flange; and
(j) means for releaseably cooperatively connecting said mounting strips to said mounting holes.

12. The split frame portable machining lathe of claim 11, wherein said connecting means are screws and said mounting bracket is slideable in and out of said slot by just unloosening, without unfastening, said screws.

13. The split frame portable machining lathe of claim 12, further comprising means for mounting a drive motor to said mounting bracket.

14. A split frame portable machining lathe for machining a workpiece, comprising:
(a) a stationary member having first and second generally semi-circular sections cooperatively connected; said stationary member having a top surface, inner sidewall and outer sidewall;
(b) means for securing said stationary member to the workpiece;
(c) a gear member having first and second generally semi-circular sections cooperatively connected;
(d) a first set of bearings cooperatively connected to said top surface of said stationary member proximate said inner sidewall;
(e) a second set of bearings cooperatively connected to said top surface of said stationary member proximate said outer sidewall, whereby a circular path is defined between said first and second sets of bearings;
(f) a generally circular race member having first and second generally semi-circular race sections, cooperatively connected to said gear member, whereby said race member rotates in said circular path; and
(g) a tool module comprising:
(i) a tool block cooperatively connected to said gear member, said tool block defining a slot;

(ii) a tool block slide adapted to be slid in said slot, said tool block slide having an opening for receiving a tool bit;
(iii) means for effecting movement of said tool block slide and also means for cooperatively connecting said tool block slide to said tool block; and
(iv) said cooperatively connecting means comprising a mounting bar connected to said tool block slide and said mounting bar being secured to said tool block by means of a fastening device through said mounting bar into a bore in said tool block.

15. The split frame portable machining lathe of claim 14, wherein one edge of said slot of said tool block comprises an adjustable gib member, wherein said gib member may be adjusted toward another edge of said slot to compensate for wear.

* * * * *

UNITED STATES PATENT AND TRADEMARK OFFICE
CERTIFICATE OF CORRECTION

PATENT NO. : 4,739,685

DATED : April 26, 1988

INVENTOR(S) : Donato L. Ricci

It is certified that error appears in the above-identified patent and that said Letters Patent is hereby corrected as shown below:

In column 3, line 61 after the word "race" delete "section 23b".

Signed and Sealed this

Twenty-fifth Day of April, 1989

Attest:

DONALD J. QUIGG

Attesting Officer

Commissioner of Patents and Trademarks